United States Patent [19]

Chu et al.

[11] Patent Number: 4,522,705
[45] Date of Patent: Jun. 11, 1985

[54] OCTANE ENHANCEMENT AND TOTAL LIQUID PRODUCT YIELD IMPROVEMENTS IN CATALYTIC CRACKING USING IN-SITU CRYSTALLIZED ZSM-5 CLAY AGGREGATES

[75] Inventors: Pochen Chu, West Deptford; Gary M. Pasquale, Sewell, both of N.J.

[73] Assignee: Mobil Oil Corporation, New York, N.Y.

[21] Appl. No.: 620,283

[22] Filed: Jun. 13, 1984

[51] Int. Cl.³ .............................................. C10G 11/05
[52] U.S. Cl. .................................... 208/120; 208/111; 502/67
[58] Field of Search ................................ 208/120, 111

[56] References Cited

U.S. PATENT DOCUMENTS 3,758,402  9/1973  Oleck et al. ........................ 208/111
3,894,934  7/1975  Owen et al. ........................ 208/78
4,091,007  5/1978  Dwyer et al. ....................... 423/118
4,235,753  11/1980  Brown et al. ...................... 423/328

FOREIGN PATENT DOCUMENTS 1321460  6/1973  United Kingdom .

Primary Examiner—Delbert E. Gantz
Assistant Examiner—O. Chaudhuri
Attorney, Agent, or Firm—A. J. McKillop; M. G. Gilman; J. F. Powers, Jr.

[57] ABSTRACT

Octane and total yield improvement in catalytic cracking of petroleum fractions under cracking conditions can be obtained by adding to conventional cracking catalysts small amounts of an additive catalyst comprising a class of zeolites characterized by a silica to alumina mole ratio greater than 5 and a Constraint Index of 1 to 12 wherein the zeolite additive catalyst is prepared via in-situ crystallization of preformed aggregates.

13 Claims, No Drawings

OCTANE ENHANCEMENT AND TOTAL LIQUID PRODUCT YIELD IMPROVEMENTS IN CATALYTIC CRACKING USING IN-SITU CRYSTALLIZED ZSM-5 CLAY AGGREGATES

BACKGROUND OF THE INVENTION

1. Field of the Invention

This invention relates to a novel catalytic cracking process to produce motor fuels. In particular, this invention relates to an improved catalytic cracking process for producing motor fuel involving the use of an additive catalyst such as ZSM-5 in conjunction with a conventional zeolite containing cracking catalyst to thereby increase gasoline octane number and gasoline plus alkylate yield. The additive catalyst utilized in the novel process of this invention is a special class of zeolites well known in the art which have been prepared by in-situ crystallization of a preformed clay aggregate as opposed to prior art routes.

2. Description of the Prior Art

Hydrocarbon conversion processes utilizing crystalline zeolites have been the subject of extensive investigation during recent years, as is obvious from both the patent and scientific literature. Crystalline zeolites have been found to be particularly effective for a wide variety of hydrocarbon conversion processes including the catalytic cracking of a gas oil to produce motor fuels and have been described and claimed in many patents, including U.S. Pat. Nos. 3,140,249; 3,140,251; 3,140,252; 3,140,253; and 3,271,418. It is also known in the prior art to incorporate the crystalline zeolite into a matrix for catalytic cracking and such disclosure appears in one or more of the above-identified U.S. patents.

It is also known that improved results will be obtained with regard to the catalytic cracking of gas oils if a crystalline zeolite having a pore size of less than 7 Angstrom units is included with a crystalline zeolite having a pore size greater than 8 Angstrom units, either with or without a matrix. A disclosure of this type is found in U.S. Pat. No. 3,769,202. Although the incorporation of a crystalline zeolite having a pore size of less than 7 Angstrom units into a catalyst composite comprising a large pore size crystalline zeolite (pore size greater than 8 Angstrom units) has indeed been very effective with respect to raising of octane number; nevertheless, it did so at the expense of the overall yield of gasoline.

Improved results in catalytic cracking with respect to both octane number and overall yield were achieved in U.S. Pat. No. 3,758,403. In said patent, the cracking catalyst was comprised of a large pore size crystalline zeolite (pore size greater than 7 Angstrom units) in admixture with ZSM-5 type zeolite wherein the ratio of ZSM-5 type zeolite to large pore size crystalline zeolite was in the range of 1:10 to 3:1. Effective cracking processes were disclosed as being achieved when the catalyst was used to obtain the inherent advantages realized in moving bed techniques, such as the thermofor catalytic cracking process (TCC) as well as in fluidized cracking processes (FCC).

The use of ZSM-5 type zeolite in conjunction with a zeolite cracking catalyst of the X or Y faujasite variety is described in U.S. Pat. Nos. 3,894,931; 3,894,933; and 3,894,934. The two former patents disclose the use of ZSM-5 type zeolite in amounts up to and about 5 to 10 weight percent; the latter patent discloses the weight ratio of ZSM-5 type zeolite to large pore size crystalline zeolite within the range of 1:10 to 3:1.

The addition of a separate additive catalyst comprising one or more members of the ZSM-5 type has been found to be extremely efficient as an octane and total yeild improver when used in very small amounts in conjunction with a conventional cracking catalyst. Thus, in U.S. Pat. No. 4,309,179, it was found that only 0.1 to 0.5 weight percent of a ZSM-5 type catalyst added to a conventional cracking catalyst under conventional cracking operations could increase octane by about 1 to 3 RON+0 (research octane number without lead).

Recently, improvements have been made with respect to enhancing the hydrothermal stability of zeolites such as ZSM-5 by silver incorporation and such is disclosed and claimed in copending application Ser. No. 587,415 filed Mar. 5, 1984. Another copending application, Ser. No. 588,253, filed Mar. 12, 1984, teaches the effect of crystallite size on hydrothermal stability.

In order to reduce automobile exhaust emissions to meet federal and state pollution requirements, many automobile manufacturers have equipped the exhaust system of their vehicles with catalytic converters. Said converters contain catalysts which are poisoned by tetraethyl lead. Since tetraethyl lead has been widely used to boost the octane number of gasoline, refiners now have to turn to alternate means to improve gasoline octane number.

One method of increasing octane number is to raise the cracker reactor temperature. This method, however, is very limited since many units are now operating at maximum temperatures due to metallurgical limitations. Raising the cracker reactor temperature also results in increased requirements for the gas plant (i.e., gas compressor and separator). Since most gas plants are now operating at maximum capacity, any increased load could not be tolerated by the present equipment.

An alternative method has been to mix an additive catalyst such as ZSM-5 to the cracking catalyst as described above. Generally, the octane gain of a ZSM-5 containing cracking catalyst is associated with gasoline ($C_5^{30}$) yield decrease and correspondingly higher yields of $C_3$ and $C_4$ gaseous products. As the freshly added ZSM-5 undergoes hydrothermal deactivation the octane enhancement is reduced and additional ZSM-5 must be added to maintain the desired octane level.

As can well be appreciated in the foregoing, it would be extremely desirable to have a more steam stable ZSM-5 additive which would in effect reduce the additive catalyst requirement to maintain a given octane level.

The combined methods for synthesis of zeolites are extensively described in the literature. Generally the aluminosilicate zeolites crystallize from aqueous systems of high pH containing sources of silica, alumina and a source of a suitable cation, typically sodium. The system is maintained under hydrothermal conditions such as room temperature up to 200° C. and higher at autogeneous pressure until the crystalline product is formed. The ratio of silica to alumina is found to be at least 2 (silicon/aluminum=1) and ranges upwardly, depending on the specific zeolite and the conditions of synthesis. The zeolites made available on a commercial scale have pore sizes varying from about 4 to about 10 or higher Angstrom Units (A).

Some newer zeolites have exhibited extremely high silica/alumina ratios. A typical such zeolite is ZSM-5 described in Argauer et al. U.S. Pat. No. 3,702,886. That patent describes crystallization of ZSM-5 by hydrothermal treatment of a reaction mixture containing sources of silica, alumina and an alkali metal oxide plus a quaternary ammonium compound such as a tetrapropylammonium salt. A somewhat similar zeolite is ZSM-11 described in Chu U.S. Pat. No. 3,709,979, where a quaternary ion compound is also employed. U.S. Pat. No. 3,941,871 to Dwyer et al. is concerned with the special case of ZSM-5 in which the alumina content is vanishly small, aptly called "organo-silicate". Other zeolites, similar in structure to ZMS-5, include ZSM-11 (U.S. Pat. No. 3,709,979 to Chu), ZSM-12 (U.S. Pat. No. 3,832,449 to Rosinski et al.), ZSM-23 (U.S. Pat. No. 4,076,842 to Plank et al.), ZSM-35 (U.S. Pat. No. 4,016,245 to Plank et al.), ZSM-38 (U.S. Pat. No. 4,046,859 to Plank et al.) and ZSM-48 (U.S. Pat. No. 4,397,827 to Chu). These zeolites have a silica/alumina ratio greater than 12 and a Constraint Index between 1 and about 12.

Zeolites are often combined with a porous matrix to provide a catalyst composition. The matrix tends to improve the activity and/or selectivity of the catalyst in certain hydrocarbon conversion processes. Inert materials which serve as the porous matrix serve as diluents to control the amount of conversion in a particular process so that products can be obtained economically and in an orderly manner without employing other means for controlling the rate of reaction. The material employed as the porous matrix may be active or inert. The porous matrix also functions as a binder for the zeolite catalyst to provide a composition having a good crush strength. Inorganic materials, especially those of a porous nature are preferred. Of these materials inorganic oxides such as clay, chemically treated clay, alumina, silica, silica-alumina and the like are particularly preferred because of the superior porosity, attrition resistance and stability they provide to the zeolitic composition. The zeolite can be combined, dispersed or otherwise intimately admixed with the porous matrix in such proportions that the resulting product contains from 1 to 95% by weight, and preferably from 1 to 70% by weight, of the zeolite in the final composite. For most commercial applications, the zeolite-porous matrix composite is provided as a hard aggregate of discrete particles; in the form of extrudates, microspheres, tablets, pellets, granules and the like which substantially retain their shape and strength in use.

Techniques for incorporating zeolites in a matrix are conventional in the art as set forth in U.S. Pat. No. 3,140,253.

U.S. Pat. No. 4,091,007 to Dwyer et al. represents a radical departure in the synthesis of ZSM-5 and it discloses a method for the preparation of ZSM-5 with which the instant invention is concerned. U.S. Pat. No. 4,091,007 relates to a method of preparing ZSM-5 zeolite as a discrete particle having a crystallinity of greater than 40 percent by preforming the reaction mixture into pellets or extrudates which retain their shape and acquire substantial strength during the crystallization process. This reaction mixture contains a source of alkali metal cations and tetralkylammonium cations, silica, alumina and water. The crystallized product can be handled in subsequent chemical processing, such as ion exchange, without necessitating cumbersome processes such as filtration. Further, these discrete particles can be used directly as catalysts after appropriate processing but without the need of any reformulation or pelletizing since the non-crystalline portion of the discrete particle serves as the porous matrix of the prior art compositions.

Another method of preparing in-situ crystallized zeolites of a preformed clay aggregate which are useful in the novel process of this invention is disclosed and claimed in U.S. patent application Ser. No. 591,723, filed Mar. 21, 1984. The disclosure of said application as well as all patents mentioned in the instant specification are herein incorporated by reference.

In said application, an improved method for preparing a crystalline, high silica zeolite is provided which comprises an in-situ synthesis of a high silica zeolite in preformed discrete particles. By employing high silica zeolite seeds in preparing the preformed composite particles, a highly crystalline product is obtained by means of an in-situ crystallization in the absence of the organic compounds required in other high silica zeolite in-situ syntheses. Following the preforming operation, the discrete particles are calcined and then contacted with an alkali metal hydroxide or other hydroxide solution to achieve the desired degree of crystallization. The integrity of the composite particles is retained during the crystallization to provide a zeolite composition in particulate form which is attrition resistant and highly stable.

Said co-pending application relates to an improvement in the process of preparing a crystalline zeolite having a silica to alumina mole ratio greater than 12 and a Constraint Index between about 1 and about 12 by reaction under hydrothermal conditions of a reaction mixture comprising water and sources of silica, alumina and alkali cations, said improvement, to provide discrete particles containing said zeolite, comprises:

(a) mixing seeds of a zeolite having a silica to alumina mole ratio greater than 1 and a Constraint Index between about 1 and about 12, a source of silica, a source of alumina and water to form discrete particles;

(b) thermally treating said particles under conditions effective to provide hard, dry, attrition resistant particles;

(c) mixing said attrition resistant particles with a source of alkali metal hydroxide or other hydroxide to form an aqueous reaction mixture having a composition effective to form the zeolite;

(d) maintaining said aqueous reaction mixture under hydrothermal conditions effective to form said zeolite whereby said zeolite is formed in said discrete particles; and (e) recovering discrete particles having said zeolite formed therein.

SUMMARY OF THE INVENTION

It has now been discovered that an improved process to enhance the octane number and total motor fuel yield in catalytic cracking units can be achieved by using zeolites having a silica to alumina molar ratio greater than 5 and a Constraint Index of between 1 and 12 which have been prepared by in-situ crystallization of the preformed clay aggregate as opposed to prior art routes. It has been found that the zeolites employed in the process of this invention derived from clay aggregates are more steam stable than corresponding zeolites prepared in accordance with the prior art routes. In other words, the novel process of this invention is limited to use in those catalytic conversion processes such as catalytic cracking where the catalyst is used in such a manner that it comes into contact with steam at elevated temperatures. The steam may be present in the feed, produced as a reaction product, added to remove products and unreactive feed from the catalyst or generated during regeneration. The net result is an irreversible loss of catalytic activity. In coke aging, however, the catalyst can be restored to almost its fresh activity by conventional regeneration techniques where the carbonaceous coke deposits are removed by burning at elevated temperatures. The relative importance of coke aging versus steam deactivation depends on the particular process involved. In a process such as catalytic cracking, steam stability is far more important than coke aging. Thus, in fluid cracking the catalyst spends over about 80% of the total residence time in the regenerator at elevated temperatures in the presence of steam. As can well be appreciated, the use of the material which has enhanced steam stability will provide improved benefits when employed in catalytic cracking process, i.e., for the production of gasoline.

DESCRIPTION OF THE PREFERRED EMBODIMENT

It has now been discovered that improved results can be obtained in the catalytic cracking of gas oil with respect to octane number and overall yield if the gas oil is cracked utilizing a catalyst composition comprising a conventional cracking catalyst containing a large pore zeolite such as zeolite Y or zeolite X in admixture with zeolites having a silica to alumina ratio greater than 5 and a Constraint Index of between 1 and 12 which are prepared by the in-situ crystallization of the preformed clay aggregate.

The manner in which the in-situ crystallized ZSM-5 (or other) zeolite is associated with the conventional cracking catalyst is not narrowly critical.

As a practical matter, the ZSM-5 or other zeolite is usually added as a separate additive catalyst. ZSM-5 zeolite is added as a separate additive catalyst in extremely small amounts which can range from 0.1 to 10 weight percent and higher based on total catalyst inventory.

Since the zeolites of the additive catalyst are very active catalytically in the fresh state, only very small quantities are necessary to obtain substantial octane improvement in a commercial cracking unit. Thus, the refiner is afforded great flexibility in commercial cracking operation, since the additive catalyst can be quickly introduced, because such a small quantity is required as compared to the total inventory of catalyst. The refiner can efficiently control the magnitude of octane increase by controlling the rate of additive catalyst addition. This type of flexibility could be useful in situations where feed composition or rate changes occur, when demand for high octane gasoline (unleaded) fluctuates, or when capacity for alkylation varies due to mechanical problems or changes in overall refinery operation.

It is clear from the foregoing that octane gain can be controlled to the extent desired by the introduction of only very small amounts of additive catalyst. In commercial practice, the octane gain could be maximized or controlled to operate at maximum light gas handling capability or full alkylation capacity.

The particular proportion of the additive catalyst introduced to the conventional cracking catalyst is important in that such a very small amount of additive catalyst is required to produce substantial octane gains. The weight percent of the zeolite constituent of the additive catalyst required in relation to the total quantity of conventional cracking catalyst in the unit can range between about 0.1 and 20 weight percent based on total catalyst in the unit. The exact weight percent will vary from cracking unit to cracking unit depending on the desired octane number, total gasoline yield required, the available feedstock and the content of active component in the conventional cracking catalyst.

The additive catalyst can be introduced at any time during the catalytic cracking process. The additive catalyst can be introduced while the cracking unit is down, or while the cracking unit is on-stream operation. Once the additive catalyst is added to the cracking process, the refiner can return to conventional operation or an operation at a lower octane number by eliminating or decreasing the use of additive catalyst. Thus the increase in octane number over the number obtainable under conventional cracking operation can be controlled by controlling the amount of additive catalyst.

Catalytic cracking units which are amendable to the process of this invention operate within the temperature range of about 400° F. to 1300° F. and under reduced atmospheric or superatmospheric pressure. The process of this invention is applicable to the fluid catalytic cracking (FCC) process and the thermofor catalytic cracking process (TCC).

The amount of additive catalyst required to increase gasoline octane number is generally based on the total quantity of conventional cracking catalyst in the unit, i.e., on the circulating inventory of conventional cracking catalyst. For example, if the additive catalyst is first introduced via the addition of fresh makeup catalyst, the amount of zeolite constituent in the additive catalyst required would be quite high as compared against the total amount of fresh makeup catalyst added, including both fresh conventional cracking catalyst and fresh ZSM-5 additive catalyst. However, after a period of time of fresh makeup catalyst addition, and once the amount of zeolite in the additive catalyst is maintained at the prescribed limits as compared to the circulating inventory of conventional cracking catalyst, the amount of said zeolite in the fresh makeup catalyst addition will generally be lowered.

As has been previously indicated, during a cracking operation, the additive catalyst such as ZSM-5 is cycled between the cracker and the regenerator where it is exposed to steam and becomes hydrothermally deactivated. As the ZSM-5 undergoes hydrothermal deactivation the octane enhancement is reduced and additional ZSM-5 must be added to maintain the desired octane level.

Quite obviously, this invention results in the use of a ZSM-5 of enhanced hydrothermal stability, thereby maintaining the activity of said ZSM-5 for a longer period of time resulting in diminished makeup requirement and catalyst costs.

A recent advance in the art of catalytic cracking is disclosed in U.S. Pat. No. 4,072,600, the entire contents of which are incorporated herein by reference. One embodiment of this aforesaid patent teaches that trace amounts of a metal selected from the group consisting of platinum, palladium, iridium, osmium, rhodium, ruthenium, and rhenium when added to cracking catalysts enhance significantly conversion of carbon monoxide during the catalyst regeneration operation.

In employing this recent advance to the present invention, the amount of said metal added to the conventional cracking catalyst can vary from between about 0.01 ppm and about 100 ppm based on total catalyst inventory. The aforesaid metals can also be introduced into the process via the additive catalyst in amounts between about 1.0 ppm and about 100 ppm based on total additive catalyst.

After cracking, the resulting product gas is compressed and the resulting products may suitably be separated from the remaining components by conventional means such as adsorption, distillation, etc.

Hydrocarbon charge stocks undergoing cracking in accordance with this invention comprise hydrocarbons generally and, in particular, petroleum fractions having an initial boiling point range of at least 400° F., a 50% point range of at least 500° F. and an end point range of at least 600° F. Such hydrocarbon fractions include gas oils, residual oils, cycle stocks, whole top crudes and heavy hydrocarbon fractions derived by the destructive hydrogenation of coal, tar, pitches, asphalts and the like. As will be recognized, the distillation of higher boiling petroleum fractions above about 750° F. must be carried out under vacuum in order to avoid thermal cracking. The boiling temperatures utilized herein are expressed in terms of convenience of the boiling point corrected to atmospheric pressure.

The members of the class of zeolites of the additive catalyst of this invention are characterized by a pore dimension greater than about 5 Angstroms, i.e., it is capable of sorbing paraffins having a single methyl branch as well as normal paraffins, and it has a silica to alumina mole ratio of at least 5. Zeolite A, for example, with a silica to alumina ratio of 2.0, is not useful in this invention, and moreover it has no pore dimension greater than about 5 Angstroms.

The members of the class of zeolites of the additive catalyst constitute an unusual class of natural and synthetic minerals. They are characterized by having a rigid crystalline framework structure composed of an assembly of silicon and aluminum atoms, each surrounded by a tetrahedron of shared oxygen atoms, and a precisely defined pore structure. Exchangeable cations are present in the pores.

The additive catalysts referred to herein utilize members of a class of zeolites exhibiting some unusual properties. These zeolites induce profound transformations of aliphatic hydrocarbons to aromatic hydrocarbons in commercially desirable yields and are generally highly effective in alkylation, isomerization, disproportionation and other reactions involving aromatic hydrocarbons. Although they have unusually low alumina contents, i.e., high silica to alumina mole ratios, they are very active even with silica to alumina mole ratios exceeding 30. This activity is surprising, since catalytic activity of zeolites is generally attributed to framework aluminum atoms and cations associated with these aluminum atoms. These zeolites retain their crystallinity for long periods in spite of the presence of steam even at high temperatures which induce irreversible collapse of the crystal framework of other zeolites, e.g., of the X and A type. Furthermore, carbonaceous deposits, when formed, may be removed by burning at higher than usual temperatures to restore activity. In many environments, the zeolites of this class exhibit very low coke forming capability, conducive to very long times on-stream between burning regenerations.

An important characteristic of the crystal structure of this class of zeolites is that it provides constrained access to, and egress from, the intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline zeolite, the oxygen atoms themselves being bonded to the silicon or aluminum atoms at the centers of the tetrahedra. Briefly, the preferred zeolites useful in the additive catalysts of the invention possess, in combination: A Constraint Index, (as defined in U.S. Pat. No. 4,309,279, the disclosure of which is incorporated by reference) of about 1 to 12, a silica to alumina mole ratio of at least about 12, and a structure providing constrained access to the intracrystalline free space.

The silica to alumina mole ratio referred to may be determined by conventional analysis. This ratio is meant to represent, as closely as possible, the ratio in the rigid anionic framework of the zeolite crystal and to exclude aluminum in the binder or in cationic or other form within the channels. Although additive catalysts comprising zeolites with a silica to alumina mole ratio of at least 5 are useful, it is preferred to use zeolites having higher ratios of at least about 18. In some zeolites, the upper limit of silica to alumina mole ratio is unbounded, with values of 30,000 and greater. Such zeolites, after activation, acquire an intracrystalline sorption capacity for normal hexane which is greater than that for water, i.e., they exhibit "hydrophobic" properties. It is believed that this hydrophobic character is advantageous in the present invention.

The zeolites comprising the additive catalysts in this invention freely sorb normal hexane and have a pore dimension greater than about 5 Angstroms. In addition, their structure must provide constrained access to some larger molecules. It is sometimes possible to judge from a known crystal structure whether such constrained access exists. For example, if the only pore windows in a crystal are formed by 8-membered rings of oxygen atoms, then access by molecules of larger cross-section than normal hexane is substantially excluded and the zeolite is not of the desired type. Additive catalysts with zeolites with windows of 10-membered rings are preferred, although excessive puckering or pore blockage may render these zeolites substantially ineffective. Additive catalysts comprising zeolites with windows of 12-membered rings do not generally appear to offer sufficient constraint to produce the advantageous conversions desired in the instant invention, although structures can be conceived, due to pore blockage or other cause, that may be operative.

The members of the class of zeolites defined herein of the additive catalyst are exemplified by ZSM-5, ZSM-11, ZSM-12, ZSM-23, ZSM-35, ZSM-38, ZSM-48 and other similar materials. Recently issued U.S. Pat. No. 3,702,886, describing and claiming ZSM-5, is incorporated herein by reference. Also, U.S. Pat. No. Re. 29,948, describing and claiming a crystalline material with an X-ray diffraction pattern of ZSM-5, is incorporated herein by reference.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-23 is more particularly described in U.S. Pat. No. 4,076,842, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which are incorporated herein by reference.

ZSM-48 is more particularly described in U.S. Pat. No. 4,397,827, the entire contents of which are incorporated herein by reference.

The zeolites used as additive catalysts in this invention may be in the hydrogen form or they may be base exchanged or impregnated to contain a rare earth cation compliment. Such rare earth cations comprise Sm, Nd, Pr, Ce and La. It is desirable to calcine the zeolite after base exchange.

Conventional cracking catalysts can contain active components which may be zeolitic or non-zeolitic. The non-zeolitic active components are generally amorphous silica-alumina and crystalline silica-alumina. However, the major conventional cracking catalysts presently in use generally comprise a crystalline zeolite (active component) in a suitable matrix. Representative crystalline zeolite active component constituents of conventional cracking catalysts include zeolite Z (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), synthetic mordenite and dealuminized synthetic mordenite, merely to name a few, as well as naturally occurring zeolites, including chabazite, faujasite, mordenite, and the like. Preferred crystalline zeolites include the synthetic faujasite zeolites X and Y, with particular preference being accorded zeolite Y.

The particle size of the individual component particles may be quite small, for example, from about 20 to about 150 microns.

The crystalline zeolite employed as a constituent in the cracking catalyst compositions of the present invention is essentially characterized by a high catalytic activity.

In general, the crystalline zeolites are ordinarily ion exchanged either separately or in the final catalyst with a desired cation to replace alkali metal present in the zeolite as found naturally or as synthetically prepared. The exchange treatment is such as to reduce the alkali metal content of the final catalyst to less than about 1.5 weight percent and preferably less than about 0.5 weight percent. The purpose of ion exchange is to substantially remove alkali metal cations which are known to be deleterious to cracking, as well as to introduce particularly desired catalytic activity by means of the various cations used in the exchange medium. For the cracking operation described herein, preferred cations are hydrogen, ammonium, rare earth and mixtures thereof, with particular preference being accorded rare earth. Ion exchange is suitably accomplished by conventional contact of the zeolite with a suitable salt solution of the desired cation such as, for example, sulfate, chloride or nitrate.

Where a matrix is used, content of crystalline zeolite, i.e., the amount of the zeolite Y component, is generally between about 5 and about 50 weight percent. Ion exchange of the zeolite to replace its initial alkali metal content can be accomplished either prior to or subsequent to incorporation of the zeolite into the matrix.

The above compositions may be readily processed so as to provide fluid cracking catalysts by spray drying the composite to form microspheroidal particles of suitable size or compounded to form TCC pellets or beads.

The following example will illustrate the novel process of this invention and it is understood that the disclosure of all patents mentioned in the specification and examples is hereby incorporated by reference.

EXAMPLES 1-2

A fluid catalyst prepared by the prior art containing 25% ZSM-5 was blended with equilibrium HEZ-53, a product of Engelhard Minerals and Chemicals, Inc., containing zeolite Y, and equilibrated in an FCC unit, to 0.25% ZSM-5 (Example 1). For comparison purposes another mixture was prepared by blending more of the equilibrium HEZ-53 with a 25% ZSM-5 containing additive catalyst, prepared by the in-situ crystallization of a preformed microspheriodal aggregate method again to 0.25% ZSM-5 (Example 2). The composite catalysts were evaluated in a fixed-fluidized bed, bench-scale unit at 960° F. initial temperature, 15.5 WHSV $hr^{-1}$ when cracking Joliet Sour Heavy Gas Oil (JSHGO) along with the base equilibrium HEZ-53 .

The results of this testing are shown in Table I at a constant converstion of 60% volume. They show that in the fresh state the clay aggregate ZSM-5 of this development is equivalent in activity, as measured by degree of octane enhancement, to a ZSM-5 additive made by the prior art method.

EXAMPLES 3-4

This is also shown in Table II which compares the two ZSM-5 additives after impregnation with a $AgNO_3$ solution to 0.2% wt. silver and dried. These were blended with the equilibrium HEZ-53 to 0.25% wt. ZSM-5 and evaluated as described.

The ZSM-5 additive catalysts of Examples 1 and 2 are impregnated with a silver nitrate solution to a 0.2 wt. percent silver and dried for 18 hours at 250° F. These were blended with the equilibrium HEZ-53 catalyst, as described in Examples 1 and 2 and evaluated for the catalytic cracking of the same gas oil at the same conditions. The results are shown in Table II. As can be seen from Table II, there is no significant difference between the catalyst of Example 3 (conventional) and the catalyst of the instant invention, Example 4 (in-situ).

EXAMPLES 5-6

The ZSM-5 additive catalysts of Examples 1 and 2 were steamed at 1450° F. for 10 hours in a 45% steam/55% air, 0 psig atmosphere to simulate commercial equilibration. The two catalysts were again blended with the equilibrium HEZ-53 to 2 wt. percent ZSM-5. These catalyst composites were tested in the previously described manner and the results are shown in Table III. The results of Table III clearly show the improved hydrothermal stability of the catalyst of this invention, i.e., Example 6. The greater octane gain shows the activity of the ZSM-5 crystallized in-situ from a preformed clay aggregate to be much greater indicating its resistance to steaming is superior when compared to the ZSM-5 produced by the prior route, i.e., Example 5. As can be seen, the much lower loss of gasoline for the octane increase proves the improved liquid product selectivity. In a commercial operation, a refiner could lower the make-up rate of the in-situ crystallized preformed aggregate ZSM-5 catalyst to achieve the required gasoline octane from the cracking unit or at the same make-up rate as with the ZSM-5 catalysts made by the prior art methods, he could achieve a higher octane gasoline production. In both cases, the loss of gasoline yield accompanying such octane increase would be much lower with the in-situ crystallized preformed aggregate ZSM-5 catalyst.

EXAMPLES 7-8

The silver impregnated ZSM-5 additive catalysts of Examples 3 and 4 were steamed at 1450° F. for 10 hours in a 45% steam/55% air, 0 psig atmosphere in a manner similar to those of Examples 5 and 6. These catalysts were again blended with equilibrium HEZ-53 to 2 wt. percent ZSM-5 and tested in the identical manner as Examples 5 and 6. The results are shown in Table IV. From Table IV it can be seen that the improved steam stability of the in-situ crystallized ZSM-5, i.e., Example 8, is clearly demonstrated. Example 8 resulted in a much higher octane increase thereby showing greater activity after steaming and improved steam stability. It is to be noted, however, that the ratio of gasoline loss to octane gain is equal for both catalysts 7 and 8. Thus, the improved liquid product selectivity, as shown in Table III, is lost with the impregnation of silver although the resistance to hydrothermal deactivation is further improved.

EXAMPLES 9-10

To further substantiate the greater stability of the in-situ crystallized preformed aggregate ZSM-5 catalyst, the ZSM-5 additive catalysts of Examples 1 and 2 were steamed more severly: 25 hrs, at 1450° F., in a 45% steam/55% air, 0 psig atmosphere. These catalysts were again blended with equilibrium HEZ-53 to 2 wt. percent ZSM-5 and tested in the previously described manner. The results are shown in Table V. The results of Table V clearly show the superior steam stability of the in-situ crystallized ZSM-5, i.e., Example 10. Example 10 shows a much larger octane gain when compared to the ZSM-5 produced by the prior art methods. The much lower loss of gasoline for the octane increase is still present proving the improved liquid product selectivity.

EXAMPLES 11-12

The silver impregnated ZSM-5 additive catalysts of Examples 3 and 4 were also given the severe steam treatment of Examples 9 and 10. These catalysts were also blended with the equilibrium HEZ-53 to 2 wt. percent ZSM-5 and tested in the same manner as the previous examples. From the results of Table IV the improved steam stability of the in-situ crystallized ZSM-5, i.e., Example 12, is again apparent. This is demonstrated by the higher octane gain compared to the prior art ZSM-5 catalyst. However, the ratio of gasoline loss to octane gain is equal for Examples 11 and 12, further showing that the improved liquid product selectivity is lost with impregnation of silver although the resistance to hydrothermal deactiviation is more improved.

EXAMPLE 13

The procedure for the preparation of the in-situ crystallized ZSM-5 used in Examples 2, 4, 6, 8, 10 and 12 is as follows:

A 58.7% solids slurry containing 1 part of ZSM-5 formed by a prior art method, 13.33 parts of Ludox AS-40 colloidal silica, containing 40% silica, and 15 parts of Georgia Kaolin Kaopague 10S kaolin clay was spray dried. The resulting microspheres were calcined in air in a static bed for three hours at 1830° F.

A slurry of 16.8 parts of the calcined microspheres, 66 parts of demineralized water, 1.35 parts of 50% sodium hydroxide and 1 part of n-propylamine was heated in an agitated autoclave to 300° F. for five hours. This resulted in a crystallinity of 25% ZSM-5 by x-ray diffraction. The product was filtered, washed and exchanged with 7.7N ammonium nitrate solution. After drying for 18 hrs at 250° F. this catalyst was blended with an equilibrium HEZ-53 to 0.25% ZSM-5.

EXAMPLE 14

The procedure for the conventional preparation of ZSM-5 used in Examples 1, 3, 5, 7, 9 and 11 is as follows:

An agitated autoclave containing 510 parts of demineralized water, 65.6 parts of 50% sodium hydroxide, 24 parts of aluminum sulfate, containing 16.3% alumina, 1 part of Daxad 27, 2.3 parts of ZSM-5 formed by a prior art method and dispersed in 8 parts of demineralized water, 240 parts of PPG's HiSil 233, containing 87% silica, 10.9 parts of sodium chloride dissolved in 40 parts of demineralized water and 29 parts of n-propylamine was heated to 320° F. for 8.5 hrs. The product contained 90% ZSM-5 as measured by x-ray diffraction. Scanning electron micrographs show the crystals to be 0.2–0.5μ in size.

The matrix for the 25% ZSM-5 catalyst was prepared by gelling 161.5 parts of sodium silicate solution, containing 28.7% silica and mixed with 542 parts of demineralized water at 50° F., by adding 4.5 parts of 96.7% sulfuric acid and 20.4 parts of aluminum sulfate, containing 16.3% alumina, dispersed in 81.5 parts of demineralized water. The pH of the gel was adjusted to 4.0 by adding 4.1 parts of 96.7% sulfuric acid. The ZSM-5 was added as a slurry of 16.7 parts of ZSM-5 in 70.8 parts of demineralized water and 1 part of a 10% Maraspserse N solution. The ZSM-5/gel mixture was filtered, reslurried to 9% solids and spray dried. The product was exchanged with a 5% ammonium sulfate solution, washed and dried at 250° F.

EXAMPLE 15

Another sample of ZSM-5 produced by in-situ crystallization of the preformed clay aggregate is described:

A silica-clay mixture was prepared by adding 17.7 parts of Georgia kaolin, 17 parts of colloidal silica (30% $SiO_2$ in $H_2O$) and 1 part of ZSM-5 seed prepared by the prior art method to 3.5 parts of $H_2O$. The mixture was agitated and homogenized into a uniform thick slurry and then spray-dried into microspheres in the particle size range that is suitable for fluid-bed catalytic application. The microspheres were further calcined in air at 1800° F. to obtain attrition-resistant properties.

The crystallization step was carried out by adding 100 parts of calcined micrspheres to a solution mixture of 220 parts of $H_2O$, 4 parts of NaOH and 6 parts of n-propylamine and heating the mixture for 16 hours at 212° F. and 4 days at 300° F. The product microspheres were water-washed and dried. The crystallinity of the product was determined by X-ray and found to be about 40% ZSM-5. The product was ion-exchanged with a 5% ammonium nitrate solution, washed and dried at 250° F.

EXAMPLE 16

The in-situ crystallized ZSM-5 additive of Example 15 was steamed at 1300° F. for 4 hours, 100% steam and is blended to 2% ZSM-5 in an equilibrium commercial cracking catalyst from Filtrol Corporation identified as FS-30 and containing zeolite Y. This was tested in a fixed fluidized bench scale unit at 900° F., 10 WHSV $hr^{-1}$ cracking the same gas oil as in Examples 1 through 12. The results are shown in Table VII.

As can be seen from Table VII the ZSM-5 prepared from the in-situ crystallization of clay aggregates resulted in enhanced octane number and again the ratio of gasoline yield loss for octane gain is much less than the additives made by the prior art techniques.

TABLE I

Fresh ZSM-5 FCC Additives Cracking JSHGO
(960° F., 15.5 WHSV $Hr^{-1}$)

| Example | Eq. Hez-53 | 1 +0.25% ZSM-5 | 2 +0.25% ZSM-5 CAI* |
|---|---|---|---|
| Conversion, % Vol | 60.0 | 60.0 | 60.0 |
| $C_5^+$ Gasoline, % Vol | 49.4 | 39.5 | 38.1 |
| Total $C_4$'s, % Vol | 11.3 | 17.4 | 16.8 |
| Dry Gas, % Wt. | 6.2 | 11.6 | 11.9 |
| Coke, % Wt. | 3.9 | 4.1 | 3.4 |
| i-$C_4$, % Vol | 3.9 | 5.7 | 5.0 |
| $C_4^=$, % Vol | 6.3 | 10.5 | 10.5 |
| $C_3^=$, % Vol | 5.7 | 13.7 | 13.8 |
| $C_5^+$ Gasoline + Potential Alkylate, % Vol | 69.5 | 79.5 | 78.3 |
| Outside i-$C_4$, % Vol | 9.7 | 21.6 | 22.5 |
| RON + 0, $C_5^+$ Gasoline | 88.7 | 92.0 | 91.6 |
| RON + 0, $C_5^+$ Gasoline + Alkylate | 90.2 | 92.8 | 92.7 |
| Δ RON + 0 | — | +3.3 | +2.9 |
| Δ $C_5^+$ Gasoline | — | −9.9 | −11.3 |
| Δ $C_5^+$ Gasoline/RON + 0 | — | 3.0 | −3.9 |

*Clay aggregate in-situ crystallized

TABLE II

Fresh AgZSM-5 FCC Additives Cracking JSHGO
(960° F., 15.5 WHSV $Hr^{-1}$)

| Examples | Eq. HEZ-53 | 3 +0.25% AgZSM-5 | 4 +0.25% AgZSM-5 CAI |
|---|---|---|---|
| Conversion, % Vol | 60.0 | 60.0 | 60.0 |
| $C_5^+$ Gasoline, % Vol | 49.4 | 39.3 | 38.4 |
| Total $C_4$'s, % Vol | 11.3 | 16.6 | 16.6 |
| Dry Gas, % Wt | 6.2 | 11.8 | 12.1 |
| Coke, % Wt. | 3.9 | 3.3 | 3.5 |
| i-$C_4$, % Vol | 3.9 | 4.6 | 5.0 |
| $C_4^=$, % Vol | 6.3 | 10.6 | 9.9 |
| $C_3^=$, % Vol | 5.7 | 14.3 | 14.6 |
| $C_5^+$ Gasoline + Potential Alkylate, % Vol | 69.5 | 80.4 | 79.0 |
| Outside i-$C_4$, % Vol | 9.7 | 23.7 | 22.7 |
| RON + 0, $C_5^+$ Gasoline | 88.7 | 91.9 | 92.2 |
| RON + 0, $C_5^+$ Gasoline + Alkylate | 90.2 | 92.8 | 93.0 |
| Δ RON + 0 | — | +3.2 | +3.5 |
| Δ $C_5^+$ Gasoline | — | −10.1 | −11.0 |
| Δ $C_5^+$ Gasoline/RON + 0 | — | −3.2 | −3.1 |

TABLE III

Steamed ZSM-5 FCC Additives Cracking JSHGO
(960° F., 15.5 WHSV $Hr^{-1}$)

| Examples | Eq. HEZ-53 | 5 +2% ZSM-5 | 6 +2% ZSM-5 CAI |
|---|---|---|---|
| Conversion, % Vol | 60.0 | 60.0 | 60.0 |
| $C_5^+$ Gasoline, % Vol | 49.4 | 46.6 | 47.6 |
| Total $C_4$'s, % Vol | 11.3 | 13.0 | 12.5 |
| Dry Gas, % Wt | 6.2 | 7.3 | 7.9 |
| Coke, % Wt | 3.9 | 4.2 | 3.6 |
| i-$C_4$, % Vol | 3.9 | 4.4 | 3.9 |
| $C_4^=$, % Vol | 6.3 | 7.4 | 7.5 |
| $C_3^=$, % Vol | 5.7 | 7.7 | 8.5 |
| $C_5^+$ Gasoline + Potential Alkylate, % Vol | 69.5 | 71.5 | 73.9 |
| Outside i-$C_4$, % Vol | 9.7 | 12.7 | 14.3 |
| RON + 0, $C_5^+$ Gasoline | 88.7 | 90.1 | 91.5 |
| RON + 0, $C_5^+$ Gasoline + Alkylate | 90.2 | 91.5 | 92.4 |
| Δ RON + 0 | — | +1.4 | +2.8 |
| Δ $C_5^+$ Gasoline | — | −2.8 | −1.8 |
| Δ $C_5^+$ Gasoline/RON + 0 | — | −2.0 | −0.6 |

TABLE IV

Steamed AgZSM-5 FCC Additives Cracking JSHGO
(960° F., 15.5 WHSV $Hr^{-1}$)

| Example | Eq. HEZ-53 | 7 +2% AgZSM-5 | 8 +2% AgZSM-5 CAI |
|---|---|---|---|
| Conversion, % Vol | 60.0 | 60.0 | 60.0 |
| $C_5^+$ Gasoline, % Vol | 49.4 | 43.9 | 41.3 |
| Total $C_4$'s, | 11.3 | 13.9 | 16.5 |
| Dry Gas, % Wt. | 6.2 | 8.8 | 9.7 |
| Coke, % Wt. | 3.9 | 4.2 | 4.1 |
| i-$C_4$, % Vol | 3.9 | 4.1 | 5.0 |
| $C_4^=$, % Vol | 6.3 | 8.6 | 10.0 |
| $C_3^=$, % Vol | 5.7 | 10.0 | 11.6 |
| $C_5^+$ Gasoline + Potential Alkylate, % Vol | 69.5 | 74.8 | 76.9 |
| Outside i-$C_4$, % Vol | 9.7 | 16.9 | 19.5 |
| RON + 0 $C_5^+$ Gasoline | 88.7 | 91.3 | 92.8 |
| RON + 0 $C_5^+$ Gasoline + Alkylate | 90.2 | 92.3 | 93.3 |
| Δ RON + 0 | — | +2.6 | +4.1 |
| Δ $C_5^+$ Gasoline | — | −5.5 | −8.1 |
| Δ $C_5^+$ Gasoline/RON + 0 | — | −2.1 | −2.0 |

TABLE V

Severe Steamed ZSM-5 FCC Additives cracking JSHGO
(960° F., 15.5 WHSV $hr^{-1}$)

| Example | Eq. HEZ-53 | 9 +2% ZSM-5 | 10 +2% ZSM-5 CAI |
|---|---|---|---|
| Conversion, % Vol | 60.0 | 60.0 | 60.0 |
| $C_5^+$ Gasoline, % Vol | 49.4 | 47.3 | 47.7 |
| Total $C_4$'s, % Vol | 11.3 | 12.7 | 12.6 |
| Dry Gas, % Wt | 6.2 | 7.1 | 7.3 |
| Coke, % Wt | 3.9 | 4.3 | 3.8 |
| i-$C_4$, % Vol | 3.9 | 4.5 | 4.1 |
| $C_4^=$, % Vol | 6.3 | 7.2 | 7.3 |
| $C_3^=$, % Vol | 5.7 | 7.2 | 7.5 |
| $C_5^+$ Gasoline + Potential Alkylate, % Vol | 69.5 | 71.1 | 72.1 |
| Outside i-$C_4$, % Vol | 9.7 | 11.8 | 12.6 |
| RON + 0, $C_5$ + Gasoline | 88.7 | 89.3 | 90.9 |
| RON + 0, $C_5$ + Gasoline + Alkylate | 90.2 | 90.9 | 91.9 |
| Δ RON + 0 | — | +0.6 | +2.2 |
| Δ $C_5^+$ Gasoline | — | −2.1 | −1.7 |
| Δ $C_5^+$ Gasoline/RON + 0 | — | −3.5 | −0.8 |

TABLE VI

Severe Steamed AgZSM-5 FCC Additives Cracking JSHGO (960° F., 15.5 WHSV hr$^{-1}$)

| Example | Eq. HEZ-53 | 11 +2% AgZSM-5 | 12 +2% AgZSM-5 CAI |
|---|---|---|---|
| Conversion, % Vol | 60.0 | 60.0 | 60.0 |
| C$_5$ + Gasoline, % Vol | 49.4 | 45.6 | 42.0 |
| Total C$_4$'s, % Vol | 11.3 | 13.9 | 14.9 |
| Dry Gas, % Wt | 6.2 | 7.5 | 9.1 |
| Coke, % Wt | 3.9 | 4.5 | 4.6 |
| i-C$_4$, % Vol | 3.9 | 5.1 | 5.2 |
| C$_4^=$, % Vol | 6.3 | 7.7 | 8.6 |
| C$_3^=$, % Vol | 5.7 | 7.4 | 10.2 |
| C$_5$ + Gasoline + Potential Alkylate, % Vol | 69.5 | 70.6 | 73.3 |
| Outside i-C$_4$, % Vol | 9.7 | 11.9 | 16.0 |
| RON + 0, C$_5$ + Gasoline | 88.7 | 90.0 | 91.7 |
| RON + 0, C$_5$ + Gasoline + Alkylate | 90.2 | 91.5 | 92.6 |
| Δ RON + 0 | — | +1.3 | +3.0 |
| Δ C$_5$ + Gasoline | — | −3.8 | −7.4 |
| Δ C$_5$ + Gasoline/RON + 0 | — | −2.9 | −2.5 |

TABLE VII

Steamed ZSM-5 CAI FCC Additive Cracking JSHGO (900° F., 10.0 WHSV Hr$^{-1}$)

| Example | Eq. FS-30 | 16 +2% ZSM-5 CAI |
|---|---|---|
| Conversion, % Vol | 61.5 | 60.6 |
| C$_5^+$ Gasoline, % Vol | 53.4 | 48.5 |
| Total C$_4$'s, % Vol | 10.1 | 10.7 |
| Dry Gas. % Wt | 6.6 | 6.3 |
| Coke, % Wt | 2.4 | 2.8 |
| RON + 0, C$_5$ + Gasoline | 84.8 | 88.1 |
| Δ RON + 0 | — | +3.3 |
| Δ C$_5^+$ Gasoline | — | −4.9 |
| Δ C$_5^+$ Gasoline/RON + 0 | — | −1.5 |

Chemical and Physical Analysis of ZSM-5 Catalysts*

| | Example 1 | Example 2 | Example 3 | Example 4 |
|---|---|---|---|---|
| Chemical Analysis Weight Percent | | | | |
| SiO$_2$ | 88.8 | 63.5 | 84.5 | 63.0 |
| Al$_2$O$_3$ | 4.7 | 33.2 | 4.3 | 33.2 |
| Na | 0.01 | 0.22 | 0.01 | 0.22 |
| N | — | 0.08 | — | 0.03 |
| C | — | 0.005 | — | 0.005 |
| Ag | — | — | 0.20 | 0.20 |
| Ash (1000° C.) | 94.5 | 99.8 | 94.3 | 99.7 |
| Physical Properties | | | | |
| Surface Area, m$^2$/g | 68 | 121 | 74 | 133 |
| Real Density, g/cc | — | 2.65 | — | 2.62 |
| Particle Density, g/cc | — | 1.49 | — | 1.53 |
| Pore Volume, cc/g | 0.12 | 0.29 | 0.16 | 0.27 |
| Packed Density, g/cc | 0.79 | 1.05 | 0.77 | 1.05 |
| Attrition Index, Corrected | 24 | 3 | 24 | 4 |

*Calcined in static bed for 3 hrs at 1000° F.

What is claimed is:

1. In a process for catalytic cracking of a petroleum fraction under cracking conditions in the presence of a conventional cracking catalyst comprising a large pore crystalline zeolite and a matrix and an additive catalyst comprising a zeolite characterized by a Constraint Index of about 1–12 and a silica to alumina mole ratio greater than about 5 in an amount which provides the zeolite component of said additive catalyst at from about 1 to about 50 wt. percent of the conventional cracking catalyst, said catalysts coming into contact with steam at elevated temperatures, the improvement wherein said additive catalyst is prepared by in-situ crystallization of a clay aggregate.

2. The process of claim 1 wherein said additive catalyst is added in an amount which provides the zeolite component of said additive catalyst at from about 0.1 weight percent to about 20 weight percent of the conventional cracking catalyst.

3. The process of claim 1 wherein said zeolite of the additive catalyst is at least one member selected from the group consisting of ZSM-5, ZSM-11, ZSM-12, ZSM-23, ZSM-35, ZSM-38, and ZSM-48.

4. The process of claim 1 wherein said zeolite additive catalyst is ZSM-5.

5. The process of claim 4 wherein said crystalline zeolite of said conventional cracking catalyst is selected from the group consisting of zeolite X, Zeolite Y, and naturally occurring faujasite.

6. The process of claim 5 wherein said crystalline zeolite of said conventional cracking catalyst is zeolite Y.

7. The process of claim 6 wherein said crystalline zeolite of said conventional catalyst is rare earth exchanged Y.

8. The process of claim 6 wherein said crystalline zeolite of said conventional catalyst is hydrogen exchanged Y.

9. The process of claim 6 wherein said crystalline zeolite of said conventional catalyst is ultrastable Y.

10. The process of claim 5 wherein said crystalline zeolite of said conventional catalyst is rare earth exchanged X.

11. The process of claim 1 wherein a metal selected from the group consisting of platinum, palladium, iridium, osmium, rhodium, ruthenium, and rhenium is added in an amount of from about 0.01 ppm to about 100 ppm, based on the total catalyst inventory, in order to enhance carbon monoxide conversion.

12. The process of claim 6 wherein said catalytic cracking is fluid catalytic cracking.

13. The process of claim 6 wherein said catalytic cracking is thermofor catalytic cracking.

* * * * *

UNITED STATES PATENT AND TRADEMARK OFFICE
CERTIFICATE OF CORRECTION

PATENT NO. : 4,522,705

DATED : June 11, 1985

INVENTOR(S) : Pochen Chu et al

It is certified that error appears in the above-identified patent and that said Letters Patent is hereby corrected as shown below:

Col. 2, line 43  "$(C_5^{30})$" should be --$(C_5^+)$--.

Signed and Sealed this

Twenty-first Day of October, 1986

[SEAL]

Attest:

DONALD J. QUIGG

*Attesting Officer*  *Commissioner of Patents and Trademarks*